(12) United States Patent
Wong (10) Patent No.: US 9,328,007 B2
(45) Date of Patent: May 3, 2016

(54) BIOGENIC FLOCCULANT COMPOSITION TO ENHANCE FLOCCULATION AND DEWATERABILITY OF CHEMICALLY ENHANCED PRIMARY TREATMENT SLUDGE

(71) Applicant: Hong Kong Baptist University, Hong Kong (HK)

(72) Inventor: Jonathan Woon-Chung Wong, Hong Kong (HK)

(73) Assignee: Hong Kong Baptist University, Hong Kong (HK)

( * ) Notice: Subject to any disclaimer, the term of this patent is extended or adjusted under 35 U.S.C. 154(b) by 161 days.

(21) Appl. No.: 14/192,845

(22) Filed: Feb. 27, 2014

(65) Prior Publication Data

US 2015/0239763 A1    Aug. 27, 2015

(51) Int. Cl.
*C02F 3/34*       (2006.01)
*C02F 11/02*      (2006.01)
*C02F 1/52*       (2006.01)
*C02F 11/12*      (2006.01)

(52) U.S. Cl.
CPC ............... *C02F 11/02* (2013.01); *C02F 1/5236* (2013.01); *C02F 3/341* (2013.01); *C02F 11/121* (2013.01); *C02F 11/122* (2013.01)

(58) Field of Classification Search
None
See application file for complete search history.

(56) References Cited

U.S. PATENT DOCUMENTS

| | | | |
|---|---|---|---|
| 3,682,592 A | 8/1972 | Kovacs et al. | |
| 4,066,748 A | 1/1978 | Lietard et al. | |
| 4,367,132 A | 1/1983 | Bell et al. | |
| 4,609,470 A | 9/1986 | Chung et al. | |
| 5,093,413 A | 3/1992 | Bhattacharyya et al. | |
| 5,100,561 A | 3/1992 | Wood et al. | |
| 5,183,576 A | 2/1993 | Wood et al. | |
| 5,422,091 A | 6/1995 | Clair et al. | |
| 5,454,948 A | 10/1995 | Tyagi et al. | |
| 5,720,887 A | 2/1998 | Vasconcellos et al. | |
| 6,217,778 B1 | 4/2001 | Shing et al. | |
| 6,294,622 B1 | 9/2001 | Barajas et al. | |
| 6,617,402 B2 | 9/2003 | Hernandez-Barajas et al. | |

FOREIGN PATENT DOCUMENTS

| | | |
|---|---|---|
| WO | 2001025156 A1 | 4/2001 |
| WO | 2001025156 A8 | 1/2002 |

OTHER PUBLICATIONS

Brian Bolto et al., "Organic polyelectrolytes in water treatment", Water Research, 2007, 41(11), p. 2301-2324.

Jae-Soo Chang et al., "Alkylamine odors from degradation of flocculant polymers in sludges", Water Research, 2005, 39(14), p. 3369-3375.

Y.C. Ho et al., "Characterization of biopolymeric flocculant (pectin) and organic synthetic flocculant (PAM): a comparative study on treatment and optimization in kaolin suspension", Bioresource Technology, 2010, 101(4), p. 1166-1174.

(Continued)

*Primary Examiner* — Chester Barry (74) *Attorney, Agent, or Firm* — Ella Cheong Hong Kong; Sam T. Yip (57) ABSTRACT

The present invention discloses a composite biogenic flocculant for enhancing flocculation and dewaterability of chemically enhanced primary treatment (CEPT) sludge. The present invention also discloses method of conditioning CEPT sludge using the composite biogenic flocculant.

7 Claims, 5 Drawing Sheets

| Parameter | CEPT sludge |
|---|---|
| pH | $6.6 \pm 0.05$ |
| ORP (mV) | $-292 \pm 12.2$ |
| Electrical conductivity (dS m$^{-1}$) | $19.52 \pm 0.7$ |
| Solids content (%) | $2.86 \pm 0.52$ |
| Organic matter (%) | $47.5 \pm 1.33$ |
| Capillary suction time (CST, s) | $170.7 \pm 14.4$ |
| Specific resistance to filtration (SRF, mg/kg) | $1.2 \times 10^{14} \pm 1.77 \times 10^{13}$ |

(56) References Cited

OTHER PUBLICATIONS

C.H. Lee et al., "Sludge dewaterability and floc structure in dual polymer conditioning", Advances in Environmental Research, 2001, 5(2), p. 129-136.

Bin Lian et al., "Microbial flocculation by Bacillus mucilaginosus: Applications and mechanisms", Bioresource Technology, 2008, 99(11), p. 4825-4831.

Fenwu Liu et al., "Improvement of sludge dewaterability and removal of sludge-borne metals by bioleaching at optimum pH", Journal of Hazardous Materials, 221-222, p. 170-177 (2012).

Keith C. K. Lai et al., "Salinity effect on mechanical dewatering of sludge with and without chemical conditioning", Environment Science & Technology, 2001, 35(23), p. 4691-4696.

F. Ma et al., "Biological flocculants used for turbidity elimination during coagulation in water treatment", Chem. Biochem. Eng. Q., 2008, 22(3), p. 321-.326.

T.T. More et al., "Bacterial polymer production using pre-treated sludge as raw material and its flocculation and dewatering potential", Bioresource Technology, 2012, 121, p. 425-431.

G.R. Xu et al., "Adsorbent obtained from CEPT sludge in wastewater chemically enhanced treatment", Water Research, 2005, 39(20), p. 5175-5185.

J.W.C. Wong et al., "pH Requirement for the Bioleaching of Heavy Metals from Anaerobically Digested Wastewater Sludge", Water, Air, and Soil Pollution, 2002, 138(1-4), p. 25-35.

J.W.C. Wong et al., "Enhanced heavy metal bioleaching efficiencies from anaerobically digested sewage sludge with coinoculation of Acidithiobacillus ferrooxidans ANYL-1 and Blastoschizomyces capitatus Y5", Water Science and Technology, 2004, 50(9), P. 83-89.

J.W.C. Wong et al., "Optimization of Fe2+/solids content ratio for a novel sludge heavy metal bioleaching process", Water Science & Technology, 2008, 57(3), p. 445-450.

J.W.C. Wong et al., "Bioleaching of heavy metals from anaerobically digested sewage sludge using FeS2 as an energy source", Chemosphere, 2004, 55(1), p. 101-107.

Zhiqiang Zhang et al., "Enhanced dewatering of waste sludge with microbial flocculant TJ-F1 as a novel conditioner", Water Research, 2010, 44(10), p. 3087-3092.

Guanyu Zheng et al., "An acid-tolerant heterotrophic microorganism role in improving tannery sludge bioleaching conducted in successive multibatch reaction systems", Environmental Science & Technology, 2009, 43(11), p. 4151-4156.

| Parameter | CEPT sludge |
|---|---|
| pH | 6.6 ± 0.05 |
| ORP (mV) | -292 ± 12.2 |
| Electrical conductivity (dS m$^{-1}$) | 19.52 ± 0.7 |
| Solids content (%) | 2.86 ± 0.52 |
| Organic matter (%) | 47.5 ± 1.33 |
| Capillary suction time (CST, s) | 170.7 ± 14.4 |
| Specific resistance to filtration (SRF, mg/kg) | 1.2 x 10$^{14}$ ± 1.77 x 10$^{13}$ |

| Parameters | CEPT control sludge | | Microbial flocculant I | Microbial flocculant II | Microbial flocculant III |
|---|---|---|---|---|---|
| | 0 h | 1 h | | | |
| pH | 6.6 ± 0.01 | 6.5 ± 0.02 | 5.7 ± 0.06 | 5.7 ± 0.03 | 6.5 ± 0.05 |
| ORP (mV) | -292 ± 12.2 | -164 ± 3.5 | -11 ± 3.2 | -138 ± 11.3 | -152 ± 10.3 |
| CST (s) | 170.7 ± 14.4 | 117.4 ± 8.3 | 31.2 ± 2.1 | 79.2 ± 5.6 | 90.5 ± 8.1 |
| SRF (m/kg) | $1.21 \times 10^{14}$ ± $1.77 \times 10^{13}$ | $5.82 \times 10^{13}$ ± $3.26 \times 10^{12}$ | $3.62 \times 10^{12}$ ± $4.53 \times 10^{11}$ | $1.46 \times 10^{13}$ ± $1.9 \times 10^{12}$ | $1.23 \times 10^{13}$ ± $1.48 \times 10^{12}$ |

Figure 3

| Parameters | Microbial components I and II | Microbial components I and III | Microbial components II and III | Microbial components I, II and III |
|---|---|---|---|---|
| pH | 5.7 ± 0.11 | 5.7 ± 0.05 | 5.9 ± 0.02 | 5.2 ± 0.04 |
| ORP (mV) | 39 ± 1.8 | 30 ± 2.5 | -132 ± 7.6 | 68 ± 3.5 |
| CST (s) | 30.1 ± 2.2 | 19.2 ± 2.1 | 71.2 ± 3.1 | 14.4 ± 0.8 |
| SRF (m/kg) | $2.4 \times 10^{12}$ ± $2.44 \times 10^{11}$ | $4.18 \times 10^{11}$ ± $5.43 \times 10^{10}$ | $1.15 \times 10^{13}$ ± $1.87 \times 10^{12}$ | $4.67 \times 10^{11}$ ± $6.54 \times 10^{10}$ |

Figure 4

| Parameters | Ratios of flocculant components I, II, and II in composite flocculant | | |
|---|---|---|---|
| | 2:1:1 | 5:1:1 | 1:1:5 |
| CST (s) | 14.0 ± 0.7 | 10.2 ± 1.1 | 13.4 ± 0.9 |
| SRF (m/kg) | $4.02 \times 10^{11}$ ± $4.42 \times 10^{10}$ | $2.91 \times 10^{11}$ ± $3.48 \times 10^{10}$ | $3.42 \times 10^{11}$ ± $4.45 \times 10^{10}$ |

Figure 5

| Parameters | Composite biogenic flocculant dosage (%, v/v) | | |
|---|---|---|---|
| | 1~3 | 3~7 | 7~10 |
| CST (s) | $108.4 \pm 13.1$ | $14.6 \pm 2.2$ | $11.2 \pm 1.4$ |
| SRF (m/kg) | $5.6 \times 10^{14}$ $\pm 7.1 \times 10^{12}$ | $1.76 \times 10^{13}$ $\pm 2.21 \times 10^{12}$ | $2.6 \times 10^{11}$ $\pm 1.77 \times 10^{10}$ |

Figure 6

| Property | Value | Property | Value |
|---|---|---|---|
| Filtering area | $0.4\ m^3$ | Total capacity | 8 L |
| Filtering pressure | $\leq 0.5$ MPa | Hydraulic pressure | 25 MPa |
| Filtering temperature | $\leq 50°C$ | Max stroke of piston | 200 mm |
| Total weight | 350 kg | | |

Figure 7

| Parameters | Control sludge | Composite flocculant conditioned sludge (2:1:1) |
|---|---|---|
| CST (s) | $175.2 \pm 16.2$ | $26.4 \pm 1.4$ |
| SRF (m/kg) | $2.32 \times 10^{14} \pm 3.25 \times 10^{13}$ | $4.68 \times 10^{12} \pm 4.38 \times 10^{11}$ |
| Filtration time (min) | >24 h | 320 |
| Moisture content (%) | $88 \pm 1.5$ | $68.5 \pm 0.9$ |

| Parameters | Control sludge | Composite biogenic flocculant conditioned sludge |
|---|---|---|
| TSS (mg/l) | 269 ± 4.5 | 182 ± 1.52 |
| TDS (mg/l) | 13740 ± 865 | 12860 ± 593 |
| COD (mg/l) | 1121 ± 15.2 | 680 ± 23.1 |

Figure 10

| Parameters | Control sludge | Composite biogenic flocculant conditioned sludge |
|---|---|---|
| Calorific value (cal/g) | 3,600 ± 137 | 4964 ± 86 |

Figure 11

BIOGENIC FLOCCULANT COMPOSITION TO ENHANCE FLOCCULATION AND DEWATERABILITY OF CHEMICALLY ENHANCED PRIMARY TREATMENT SLUDGE

FIELD OF INVENTION

The present invention aims at solving issues related to wastewater treatment facilities by a method for rapid flocculation, and improving filterability and dewaterability of sewage sludge. More particularly, it relates to a novel composite biogenic flocculant having a blend of different microbial consortia exhibiting multifunctional activities that enhances the sludge dewaterability and using the composite biogenic flocculant for rapid flocculation, and improving the filterability and dewaterability of sewage sludge.

BACKGROUND OF INVENTION

Domestic wastewater is conventionally treated via primary, secondary and tertiary process before disposing or recycling. Chemically enhanced primary treatment (CEPT) process has been implemented as an alternative treatment process to the conventional process for domestic sewage. As large quantity of wastewater is rapidly treated in this process, CEPT process is greatly useful for rapidly-growing mega cities and developing countries. The CEPT plant located at Stonecutters Island, Hong Kong is one of the biggest CEPT plant in the world, which treats 1.4 million m$^3$ sewage per day. Typically the CEPT process is used to treat the sewage using inorganic trivalent flocculants, generally ferric chloride, followed by the anionic polymer for removal of suspended solids from the wastewater. After the polymer treatment, the flocculated sewage is allowed for settling of suspended solids particles. The settling process leaves a huge quantity of the sludge which contains a water content of >95%.

The primary sludge contains a bulk volume of water and suspended particles. The solids content of the CEPT sludge ranges around 2~4% by weight. For safe disposal or further utilization of the primary sludge, the sludge solids must be removed from water and stabilized. Dewatering of the sludge is essential that can be achieved by mechanical dewatering process through filter pressing or centrifugation after appropriate preconditioning of sludge. Due to the high strength suspended particles having high negative charge, the CEPT sludge is difficult to dewater and it needs to be conditioned with very efficient flocculants to improve the dewaterability.

The inorganic metal flocculants and organic polymers are generally used as pre-dewatering conditioning agents. However, due to the requirement of large quantity of inorganic flocculants, sludge management itself is an expensive process in sewage treatment. Excessive FeCl$_3$ would cause more serious issue. In sludge dewatering process, the typical doses of polyelectrolyte polymers between 1-10 kg per metric ton of dry sludge solids are used, and the polymers thus accounts for 0.1% -1% of the total dry solid mass of a conditioned sludge. Requirement of huge quantities of the expensive flocculants itself covers about 50% cost of the sludge treatment process. In addition, some cationic organic polymers used to enhance thickening and dehydration processes could result in strong odors due to their degradation during the storage of dewatered sludge. Moreover, polymeric flocculants and their derivatives, pose a number of ecological hazards as some of the derivatives are non-biodegradable and the intermediate products of their degradation are hazardous to human health as their monomers are neurotoxic and carcinogenic. Therefore, environmental-friendly and safe coagulants need to be developed for sludge dewatering.

To alleviate the concerns over the use of synthetic flocculants, currently, biogenic flocculants are drawing increasing attention due to their satisfied flocculating effectiveness and safe biodegradable nature. Biogenic flocculants are the inorganic and organic flocculants derived from microbial cultures as a whole or their products. Microbial bioflocculants have been demonstrated for potential removal of suspended solids, chemical oxygen demand (COD), and heavy metals from several wastewaters, including domestic, brewage and pharmaceutical wastewaters. Most of the microbial bioflocculants reported are polysaccharides, which are mainly involved in coagulation/flocculation process via bridging mechanism only. On the other hand, biogenic ferric iron produced by acidophilic iron-oxidizing bacteria can also be used as potential coagulant/flocculant for sludge dewatering.

The present invention provides a novel composite biogenic flocculant using non-hazardous and low-cost commercially available chemicals, naturally occurring microbes and renewable waste materials and method of manufacturing the same. The present composite biogenic flocculant comprises both autotrophic and organotrophic microbes that produce strong flocculants. Autotrophic microbes employed in the present invention are acidophilic bacteria that obtain energy from iron containing substrate and elements that contain sulfur, and a consortium of organotrophs isolated from organic wastes. The present method of manufacturing a composite biogenic flocculant involves the use of autotrophic and organotrophic bacteria and less expensive divalent iron source, and rapid production of flocculant. The composite biogenic flocculant rapidly improves the sludge dewaterability.

Citation or identification of any reference in this section or any other section of this application shall not be construed as an admission that such reference is available as prior art for the present application.

SUMMARY OF INVENTION

In a first aspect, the present invention provides a composite biogenic flocculant for CEPT sludge conditioning comprising at least one flocculant component, wherein the at least one flocculant component comprises a first flocculant component comprises at least one acidophilic auto-trophic iron-oxidizing bacterium and at least one species of acid tolerant organotrophic microbes which are grown in medium containing iron (II) salt as energy substrate or organic waste hydrolyzate as growth medium; a second flocculant component comprises a consortium of sulfur oxidizing bacterium in a mineral medium or in sludge filtrate with sulfur as energy substrate, wherein the second flocculant component is at a concentration from 0.1% to 1% (v/v); and a third flocculant component comprises an organotrophic consortium which comprises at least three different organotrophic microbes using sludge or food waste hydrolyzate as cultivation medium.

In a first embodiment of the present invention, the at least one acidophilic auto-trophic iron-oxidizing bacterium of the first flocculent component comprises *Acidithiobacillus ferrooxidans* ANYL-1 (5~10%, v/v).

In a second embodiment of the present invention, the at least one species of acid tolerant organotrophic microbes of the first flocculent component comprises *Dipodascus ingens* at a concentration of 1~3% (v/v), *Candida utilis* YE1 at a concentration of 1~3% (v/v), and *Cryptococcus curvatus* YE2 at a concentration of 1~3% (v/v).

In a third embodiment of the present invention, the consortium of sulfur oxidizing bacterium of the second flocculant component comprises *A. ferrooxidans* ANYL-1 and *A. thiooxidans* ACS2 each at cell concentration between $10^7$ and $10^8$ cells/mL.

In a fourth embodiment of the present invention, the at least three different organotrophic microbes of the third flocculant component comprises *Brevibacillus cereus* BU1, *Bacillus licheniformis* BU2, and *Brevibacillus borstelensis* BU3 at cell concentration between $10^8$ and $10^9$ cells/mL.

In a fifth embodiment of the present invention, the ratio of the first, second and third flocculant components which are blended together is 1-5:1-5:1-5 to form the composite biogenic flocculant.

In a second aspect of the present invention, there is provided a method for conditioning CEPT sludge in the following steps: (a) mixing a volume of sludge with a conditioning agent; (b) incubating the sludge for at least 1 hour in a shaking incubator at about 30° C. for flocculation and settling, and (c) dewatering the conditioned sludge using mechanical filtering through capillary suction, vacuum and pressure filtration methods.

In a first embodiment of the second aspect of the present invention, there is provided the method for conditioning CEPT sludge wherein the conditioning agent is the first flocculant component at a concentration between 3% to 7% (v/v).

In a second embodiment of the second aspect of the present invention, there is provided a method wherein the conditioning agent is the second flocculant component, at a concentration between 0.1% to 1.0% (v/v).

In a third embodiment of the second aspect of the present invention, there is provided a method wherein the conditioning agent is the third flocculant component, at a concentration between 1% to 10% (v/v).

In a fourth embodiment of the second aspect of the present invention, wherein the conditioning agent is a composite biogenic flocculant comprising the first and second flocculant components, the first and third flocculant components, the second and third flocculant components or the first, second and third flocculant components each at equal proportion.

In a fifth embodiment of the second aspect of the present invention, wherein the conditioning agent is a composite biogenic flocculant comprising two or more of the first, second or third flocculant components of different proportions, wherein proportions of the first, second and third flocculant components range from 1 part to 5 parts. In one embodiment, the composite biogenic flocculant comprises 5 parts of the first flocculant component, 1 part of the second flocculant component and 1 part of the third flocculant component.

In a sixth embodiment of the second aspect of the present invention, wherein the conditioning agent is 1% to 10%, or no less than 3% to 7% (v/v) of the total volume of the sludge and conditioning agent mixture.

In a seventh embodiment of the second aspect of the present invention, wherein the dewaterability of the conditioned CEPT sludge is assessed using a filter press.

Those skilled in the art will appreciate that the invention described herein is susceptible to variations and modifications other than those specifically described.

The invention includes all such variation and modifications. The invention also includes all of the steps and features referred to or indicated in the specification, individually or collectively, and any and all combinations or any two or more of the steps or features.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. patent law; e.g. they can mean "includes", "included", "including", and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the invention and apply throughout. Unless otherwise defined, all other technical terms used herein have the same meaning as commonly understood to one of ordinary skill in the art to which the invention belongs.

Other aspects and advantages of the invention will be apparent to those skilled in the art from a review of the ensuing description.

BRIEF DESCRIPTION OF DRAWINGS

The above and other objects and features of the present invention will become apparent from the following description of the invention, when taken in conjunction with the accompanying drawings, in which:

FIG. 9 shows images of filter cake obtained after pressure filtration of the CEPT sludge. Control sludge (FIG. 9a) and preconditioning with composite biogenic flocculant (FIG. 9b).

DETAILED DESCRIPTION OF INVENTION

The present invention is not to be limited in scope by any of the specific embodiments described herein. The following embodiments are presented for exemplification only.

EXAMPLE 1

Sludge Collection and Characterization

Figure 1:
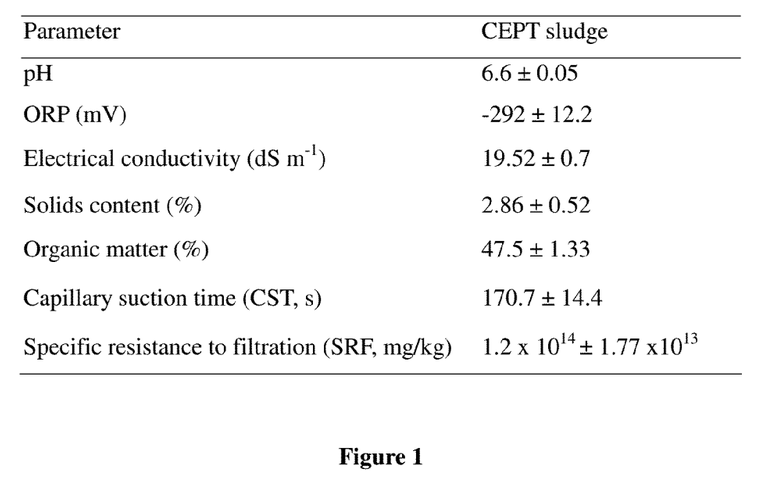
FIG. 1 shows physicochemical properties of CEPT sludge used in the present invention.

CEPT sludge is collected from Stonecutter Island sewage treatment plant, Hong Kong Special Administrative Region, China. The sludge samples are quickly brought to laboratory and analyzed for physiochemical properties and stored at 4° C. The physiochemical properties of CEPT sludge are presented in FIG. 1, which reveals that CEPT sludge has a high negative ORP, high CST and SRF values. These properties indicate that CEPT sludge could not be easily settled, and need very efficient flocculants and conditioning methods to separate the water and solid portions of the sludge. The sludge used in the different experiments are cold stored sludge. Thus, the initial properties might vary in different experiments.

EXAMPLE 2

Production of Biogenic Flocculants

The present invention provides three different microbial flocculant components I, II and III, for use in preparing a composite biogenic flocculant for sludge dewatering. Acidophilic iron-oxidizing bacteria *Acidithiobacillus ferrooxidans* ANYL-1 is grown in modified M9 mineral medium. Acid tolerant yeasts are *Dipodascus ingens, Candida utilis* and *Cryptococcus curvatus*. Erlenmeyer flasks (500 mL) containing 200 mL culture medium and energy substrate $FeSO_4.7H_2O$ (22.1 g to 44.2 g/L) are inoculated with seed cultures of *A. ferrooxidans* (5~10%) and acid tolerant yeasts each at 1~2% (%, v/v). The flasks are incubated at 180 rpm and 30° C. until the culture pH reaches 2.0~2.2. The consortium was then used to prepare the composite biogenic flocculant. The acidophilic microbial consortium composes of divalent and trivalent irons, secondary iron minerals, bacterial and yeast cells and their bio-polymeric compounds.

Biogenic mineral acids producing consortium consisting of sulfur oxidizing bacteria *Acidithiobacillus thiooxidans* ACS2 and *A. thiobacillus* ANAL-1 are cultured in mineral salt medium or sludge filtrate supplemented with elemental sulfur as energy substrate, at between 0.1% and 1% (v/v). The consortium is grown for 3~4 days to reach pH level <2. The filtered culture is used as flocculant for sludge condition and for formulation of composite biogenic flocculant.

Organotrophic bacterial consortium is prepared using hydrolyzate of organic wastes (activated sludge and food waste). The consortia contained three different bacterial strains (*Brevibacillus cereus* BUJ, *Bacillus licheniformis* BU2, and *Brevibacillus borstelensis* BU3) that are isolated from different organic wastes. All these strains are able to grow as consortium in medium derived from organic waste hydrolyzate and secrete polymeric substances in growth medium. Organotrophic consortium is grown in broth culture for 3~4 days at temperature between 30° C. and 37° C., and then the whole culture or culture supernatant is used for preparation of composite flocculant.

EXAMPLE 3

Preparation of Multifunctional Composite Biogenic Flocculants

CEPT sludge is a highly complex matrix, which contained microbial flocs with extracellular polymeric substances and anionic polymer. Highly negative oxidative-reductive potential of CEPT sludge indicates poor dewaterability of the sludge. For effective flocculation sludge flocs and reduction of water content needs a flocculant with versatile function. The present invention provides a composite biogenic flocculant formulated with a combination of microbial flocculants exhibiting different functions. In the composite biogenic flocculant, the first flocculant component (flocculant component I) is a biogenic trivalent iron flocculant generating microbial culture, the second flocculant component (flocculant component II) is biogenic mineral acid producing microbial consortium and the third flocculant component (flocculant component III) is a consortium of organotrophic microbes that releases polymeric substances. Pregrown cultures of these microbial components are blended during or prior to sludge treatment. The blending ratios of each flocculant components are between 1 and 5. The following examples describe the sludge conditioning with individual and composite biogenic flocculants to improve the dewaterability.

EXAMPLE 4

Conditioning of CEPT Sludge Using Individual Biogenic Flocculants

Figure 2:
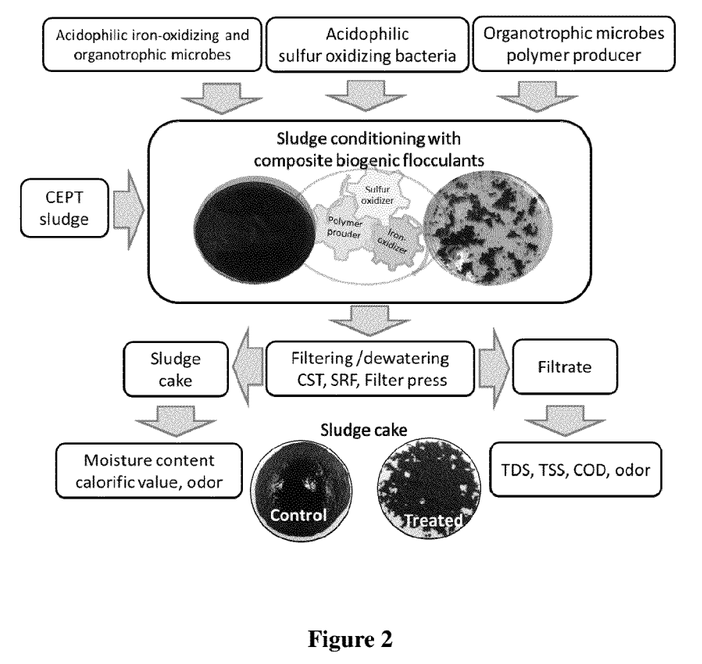
FIG. 2 shows schematic drawing of sludge conditioning process using biogenic flocculants.

As CEPT sludge is generated after treating the sewage with ferric chloride ($FeCl_3$) followed by an anionic polymer, the nature of CEPT sludge is different from primary sludge, activated sludge and anaerobically digested sludge generated during conventional sewage treatment process. CEPT sludge is collected from Stonecutter Island wastewater plant and physiochemical properties thereof are summarized in FIG. 1. The process flow of sludge conditioning and dewatering is shown in FIG. 2. Conditioning of CEPT sludge is performed by mixing the biogenic flocculants I, II, and III individually at a dosage between 0 and 10% (v/v) to the sludge in a conical flasks with rapid mixing at 180 rpm for 1 hour. To evaluate the effect of biogenic flocculants described in Example 2 on dewaterability of CEPT sludge, the capillary suction time (CST) and the specific resistance to filtration (SRF), the standard laboratory parameters are measured to determine the sludge dewaterability. The CST of sludge samples is determined by capillary suction timer (Model 304M CST, Triton, Britain), while the SRF of sludge is measured by the Buchner funnel test. CETP sludge also has high pH, CST and SRF values making it difficult to dewater.

Figure 3:
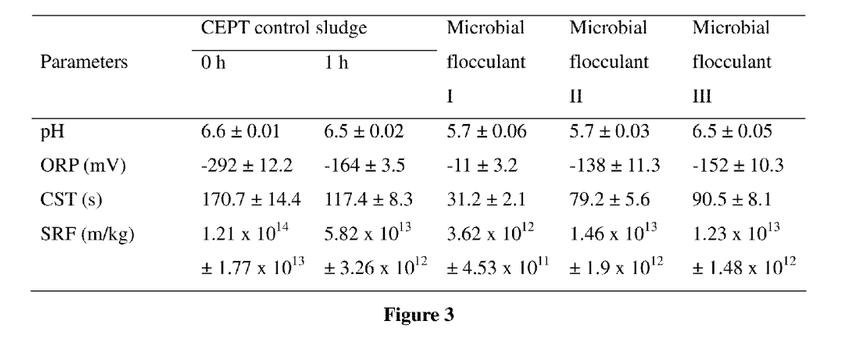
FIG. 3 shows physiochemical properties of dewaterability of CEPT sludge conditioned with the first, second and third flocculant components of the present invention.

The pH, ORP, and dewaterability parameters are measured before and after conditioning, and the results are given in FIG. 3. Upon exposure to aeration under shaking, the ORP increases, and CST and SRF values decrease in the control sludge. However, these levels indicate that it is very difficult to dewater the CEPT sludge without conditioning. In the sludge conditioned with biogenic flocculants, the initial pH of the sludge declines from 6.6 to 5.7 with flocculant I or flocculant II conditioning after 1 hour while conditioning with flocculant component III shows no reduction. The high negative ORP values increases rapidly in flocculant I treatment.

Rapid increase of ORP is conducive for good dewaterability. Under different flocculant treatments, CST of CEPT sludge rapidly decreases from 170.7 s to 31.2 s with flocculant I, while flocculant II and flocculant III achieve 53.6% and 47% reduction, respectively. The SRF values of conditioned sludge reveals that 97%, 87.9% and 90% reduction with flocculants I, II and III, respectively. Significant improvement in dewaterability of conditioned CEPT sludge after 1 hour treatment indicating a clear advantage of the biogenic flocculants of the present invention. However, the CST value of less than 20 s is desirable for rapid dewaterability of the CEPT sludge.

EXAMPLE 5

Effect of Composite Biogenic Flocculant on Dewaterability of CEPT Sludge

The results of example 4 clearly indicate that the biogenic flocculants effectively enhance the dewaterability of the CEPT sludge. However, the filterability rate should be further enhanced. Example 4 indicates the different extents of dewaterability in different biogenic flocculants as they differed in their active components and mechanisms of sludge flocculation. The present invention provides a versatile and synergistic functional composite flocculants formulated by blending these biogenic flocculants at appropriate proportions according to the nature of sludge properties for dewatering CEPT sludge. A combination of flocculants I, II and III are blended at equal ratio for sludge conditioning. A total volume of 300 mL of sludge supplemented with composite biogenic flocculant ranges between 3 and 7% (v/v) is incubated at 30° C. for 1 hour on a shaking incubator at 180 rpm. Then, pH, ORP, CST and SRF are determined.

Figure 4:
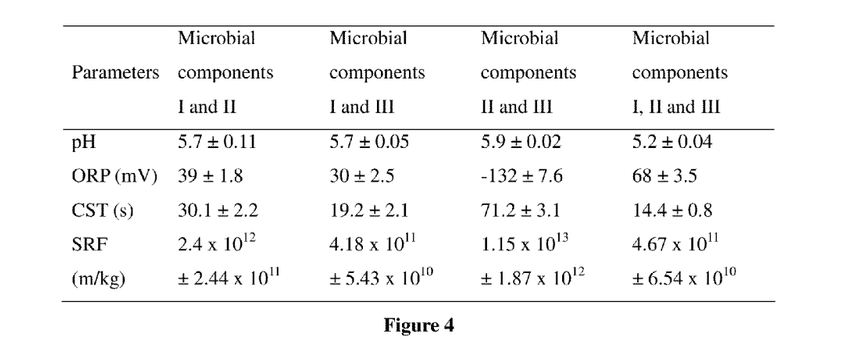
FIG. 4 shows physiochemical properties of dewaterability of CEPT sludge conditioned with composite biogenic flocculants comprising equal portions of flocculant components of the present invention.

Compared to the individual flocculants, composite biogenic flocculants composed of a combination of flocculants I, II and III show a very effective reduction in CST and SRF as shown in FIG. 4. The CST values decrease drastically with composite flocculant with a combination of all three biogenic flocculants. Similarly, the initial SRF values of sludge also greatly decrease up to 98.2%, 99.65%, 90.5% and 99.61% in composite flocculant conditioned sludge with combination of biogenic flocculants I plus II, I plus III, II plus III, or I, II plus III, respectively. The sludge conditioned with the composite flocculants of flocculant components I plus II, I plus III, or I, II plus III shows similar dewaterability efficacy as compared to flocculants II plus III. The results of present invention clearly indicate the present composite flocculant for CEPT sludge dewatering, and the synergistic action of the three different biogenic flocculant components.

EXAMPLE 6

Figure 5:
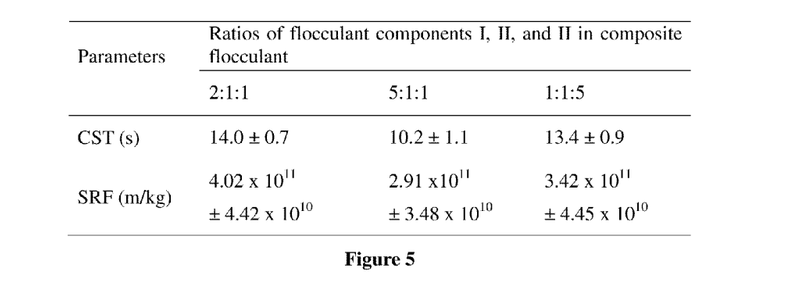
FIG. 5 shows physiochemical properties of dewaterability of CEPT sludge conditioned with composite biogenic flocculant containing different ratios of the first, second and third flocculant components of the present invention.

Effect of Composite Flocculant on Dewaterability of CEPT at Different Ratios of Flocculant Components Example 5 proves that the dewatering efficacy in equal ratios of flocculant components. Flocculant component I contains biogenic trivalent iron based flocculant generated by iron-oxidizing bacteria. Flocculant component II contains biogenic mineral acids produced by sulfur-oxidizing microbes. Flocculant component III is organotrophic microbes that secret flocculating agents. Example 6 illustrates the optimum ratio of the three biogenic flocculants. Sludge conditioning is done as shown in example 3 using the flocculants I, II and III each varying at ratios between 1 and 5. As depicted in FIG. 5, increasing the proportion flocculants I shows enhanced levels of dewaterability. The CST and SRF values are lower than that observed in example 5 with the flocculants of equal ratio for the combined biogenic flocculant. This clearly demonstrates the synergistic effect of combining the flocculants to composite. The flocculant component III derived from organotrophic microbial consortium also shows effective dewaterability in combination with other flocculants. This is attributed to the synergistic actions of the three different flocculants. The flocculant component II involves in acidification and destructing the integrity of sludge flocs that could facilitate releasing the water from sludge flocs.

EXAMPLE 7

Figure 6:
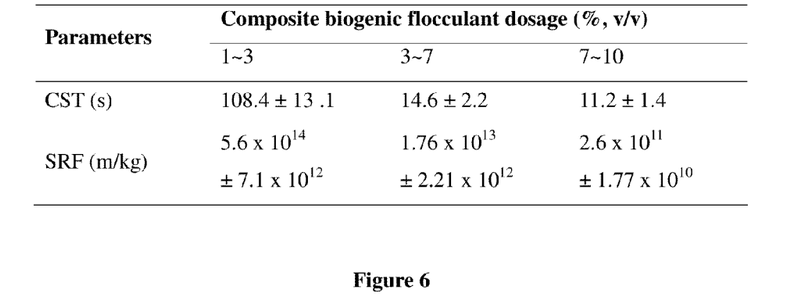
FIG. 6 shows physiochemical properties of dewaterability of CEPT sludge conditioned with different concentrations of composite biogenic flocculant of the present invention.

Effect of Different Dosage of Composite Flocculant on Dewaterability of CEPT Sludge The dosage of the flocculant is an important criterion for effective flocs conditioning. In example 6, the effective combination of different microbial flocculant is disclosed. This example discloses the optimum dosage of composite biogenic flocculant consisting of 2 parts of flocculant I, 1 part flocculant II and 1 part of flocculant III, on conditioning and dewaterability of CEPT sludge. Composite biogenic flocculant is incubated with CEPT sludge at 1 to 10% (v/v) in a 500 mL conical flasks at 30° C. for 1 hour on a shaking incubator at 180 rpm. Then the dewaterability parameters CST and SRF are measured. As depicted in FIG. 6, an increase in the dosage of composite biogenic flocculant resulted in greater reduction in CST and the SRF values of conditioned sludge. A dosage between 3% and 7% (v/v) of composite biogenic flocculant, CST values decreases to lower than 20 s. This indicates a dosage between 3% and 7% (v/v) is minimum requirement to achieve desirable dewaterability of sludge. The SRF value of CEPT sludge ($1.21 \times 10^{14}$ m/kg) decreases between 54.8% and 99.8% when conditioned with composite biogenic flocculant dosage at 1 to 10% (v/v).

EXAMPLE 8

Dewaterability Assessment by Filter Press

Figure 7:
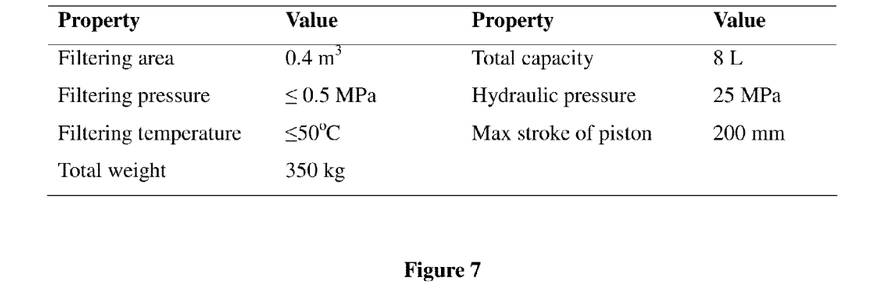
FIG. 7 shows characteristics of the filter press used to assess the sludge dewaterability of the present invention.

Previous examples demonstrate the conditioning and dewaterability of CEPT sludge by composite biogenic flocculant in batch experiments using low volume of sludge in conical flasks. The dewaterability is mainly assessed by CST and SRF of the conditioned sludge. This example demonstrates the dewaterability of composite biogenic flocculant using a mini scale filter press. The characteristics of the filter press used in this example are summarized in FIG. 7. FIG. 7 shows characteristics of the filter press used to assess the sludge dewaterability. Before filtering, 80 L of the CEPT sludge is preconditioned for 1 hour with appropriate composition of composite biogenic flocculant dosage between 3% and 7% (v/v) with constant mixing at 100 rpm using a motor driven propeller. Conditioned sludge is pumped into the filter press using a compressor pump. After complete pumping of the 80 L of the sludge, the chambers pressure is released to open the chambers. The sludge cakes obtained from the filter chambers are used for the analysis of moisture content, calorific value and organic matter. The filtrate collected from outlet of the filter press is used to determine the TSS, TDS and COD.

Figure 8:
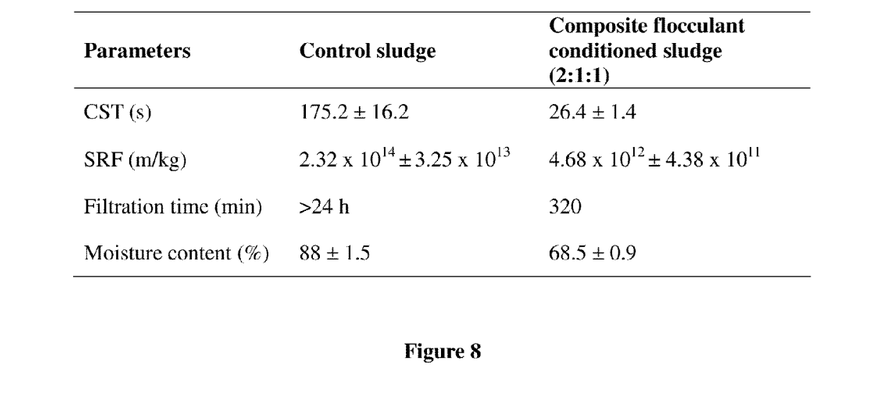
FIG. 8 shows physiochemical properties of dewaterability of CEPT sludge conditioned with composite biogenic flocculant of the present invention; dewaterability is determined using filter press.
Figure 9A:
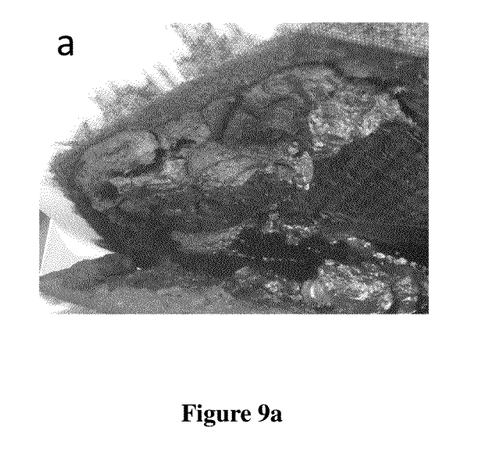
Figure 9B:
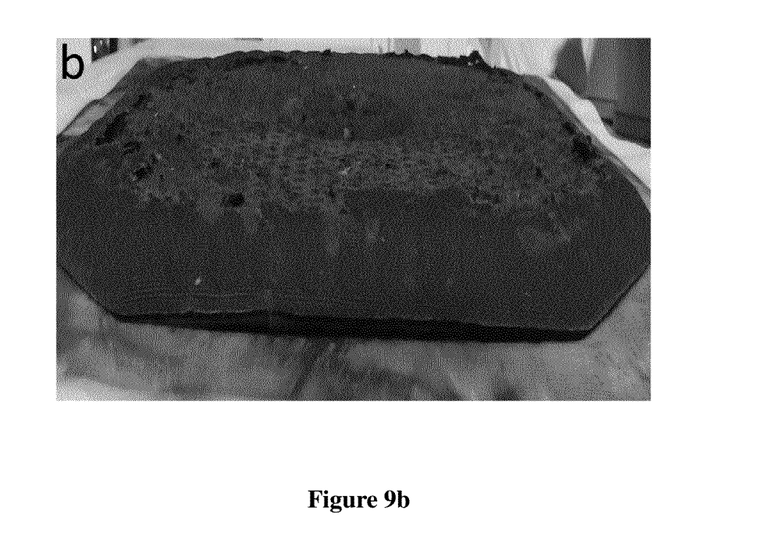
Figure 10:
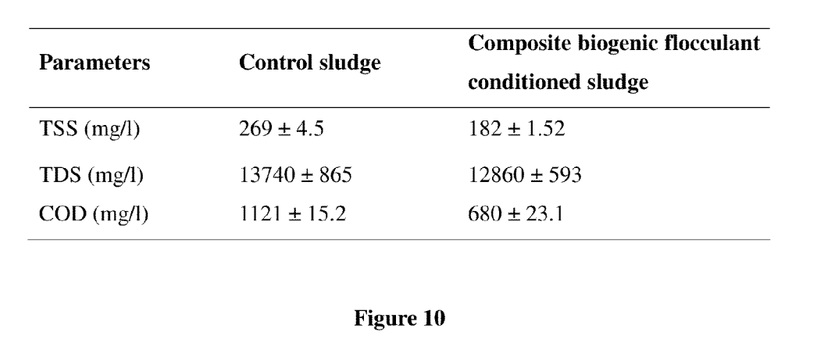
FIG. 10 shows properties of sludge filtrate obtained from control and composite biogenic flocculant conditioned CEPT sludge of the present invention.

The control CEPT sludge shows very poor dewaterability and whole volume of sludge could not completely passed through even after 24 hour filtering (FIG. 8). No compact solid sludge filter cake is formed as shown in FIG. 9*a*. The filtered solids of control sludge remains in thick slurry/semi solid form with the moisture content of over 88% by weight. This clearly illustrates the poor dewaterability of unconditioned CEPT sludge. Whereas, in case of CEPT sludge conditioned with the composite biogenic flocculant according to the present invention, the CST and SRF values decrease rapidly. Conditioned sludge is filtered rapidly through the filter press in a short period of time than the control sludge and the rapid dewaterability resulted in a very thick and compact solid filter cake as shown in FIG. 9b. The moisture content of the filter cake is 68.5% by weight indicating the effects of composite biogenic flocculant on improving the dewaterability of CEPT sludge. The pollution load in the filtrate of conditioned sludge also decreases. The filtrate of control sludge is turbid and dark in color. On the other hand, the filtrate from composite biogenic flocculant conditioned sludge is clear and has much lower turbidity due to the reduction of TSS and TDS as depicted in FIG. 10. Consequently, the COD of the filtrate also significantly decreases to about 60.6% in conditioned sludge filtrate. The odor of the conditioned sludge decreases to tolerable level whereas in control CEPT sludge the odor is very offensive in slugged can and filtrate. This obviously indicates that the composite biogenic flocculant according to the present invention has a strong odor reduction effect. Mechanical dewaterability through filter press clearly demonstrates the positive effects of composite biogenic flocculant provided in the present invention.

EXAMPLE 9

Determination of Gross Calorific Value of the Sludge Cake

Figure 11:
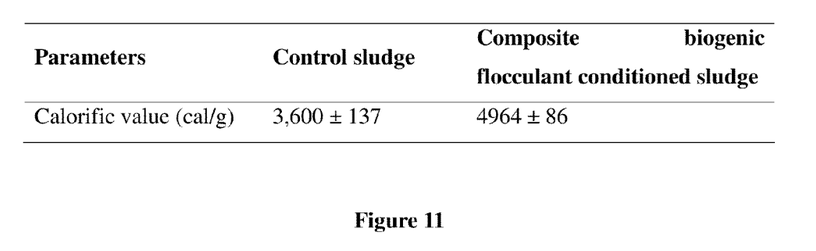
FIG. 11 shows Calorific values of dewatered CEPT sludge cake obtained from control and composite biogenic flocculant conditioned sludge of the present invention.

Energy recovery from sewage sludge cake is a sustainable waste management practice. Example 9 demonstrates the thermal calorific values of dewatered sludge cake obtained from the control and composite biogenic flocculant conditioned CEPT sludge of the present invention. The sludge cakes obtained from Example 8 are dried at 105° C. to measure the moisture content and then used to determine the calorific values. The results show that the calorific value of the composite biogenic flocculant conditioned sludge cake increase by 37.8% over the control sludge cake (FIG. 11). This indicates that composite biogenic flocculant conditioned sludge cake is highly useful for thermal energy production due to retainment of organic compounds in the sludge cake by the composite biogenic flocculant treatment. Furthermore, it also removes the dissolved organic contents from the sludge water, which will reduce the pollutant load in the effluent. This is also an added advantage of the composite biogenic flocculant of the present invention.

The different examples demonstrated above clearly justify the claims of the invention that the novel approach using the indigenous microbes for production of composite biogenic flocculant and its application to improve the dewaterability of CEPT sludge. This invention can be an alternative to solve the sewage sludge treatment problem.

INDUSTRIAL APPLICABILITY

The present invention provides solutions to wastewater treatment facilities and pertains to a method for rapid flocculation, and improving filterability and dewaterability of sewage sludge. More particularly, it relates to a novel composite biogenic flocculant comprising a blend of different microbial consortia exhibiting multifunctional process that enhance the sludge dewaterability.

If desired, the different functions discussed herein may be performed in a different order and/or concurrently with each other. Furthermore, if desired, one or more of the above-described functions may be optional or may be combined.

While the foregoing invention has been described with respect to various embodiments and examples, it is understood that other embodiments are within the scope of the present invention as expressed in the following claims and their equivalents. Moreover, the above specific examples are to be construed as merely illustrative, and not limitative of the reminder of the disclosure in any way whatsoever. Without further elaboration, it is believed that one skilled in the art can, based on the description herein, utilize the present invention to its fullest extend. All publications recited herein are hereby incorporated by reference in their entirety.

What is claimed is:

1. A biogenic flocculant composition for CEPT sludge conditioning comprising
   a) a first flocculant component which comprises at least one acidophilic auto-trophic iron-oxidizing bacterium and at least one species of acid tolerant organotrophic microbes which are grown in medium containing iron (II) salt as an energy substrate or an organic waste hydrolyzate as a growth medium;
   b) a second flocculant component which comprises a consortium of sulfur oxidizing bacterium in a mineral medium or in sludge filtrate with sulfur as an energy substrate, at concentrations of 0.1% to 1% (v/v); and
   c) a third flocculant component which comprises an organotrophic consortium comprising at least three different organotrophic microbes using sludge or food waste hydrolyzate as a cultivation medium.

2. The composition according to claim 1 wherein the at least one acidophilic auto-trophic iron-oxidizing bacterium comprises *Acidithiobacillus ferrooxidans* ANYL-1 (5~10%, v/v).

3. The composition according to claim 1 wherein the at least one species of acid tolerant organotrophic microbes comprises *Dipodascus ingens* (1~3%, v/v), *Candida utilis*YE1 (1~3%, v/v) and *Cryptococcus curvatus* YE2 (1~3%, v/v).

4. The composition according to claim 1 wherein the consortium of sulfur oxidizing bacterium comprises *A. ferrooxidans* ANYL-1 and *A. thiooxidans* ACS2.

5. The composition according to claim 1 wherein the at least three different organotrophic microbes comprises *Brevibacillus cereus* BU1, *Bacillus licheniformis* BU2, and *Brevibacillus borstelensis*BU3.

6. The composition according to claim 1 wherein the first, second and third flocculant components are blended in a ratio of 1-5: 1-5: 1-5.

7. The composition according to claim 6, wherein the first, second and third flocculant components are in a ratio of 5:1:1.

* * * * *